US012684190B2

(12) United States Patent
Schectman et al.

(10) Patent No.: US 12,684,190 B2
(45) Date of Patent: Jul. 14, 2026

(54) METHOD FOR SIMULTANEOUSLY SENDING DIFFERENT MEDIA INPUTS TO DIFFERENT USERS

(71) Applicant: Dark Arcade Theater, LLC, Chatsworth, CA (US)

(72) Inventors: Samuel Schectman, Northridge, CA (US); Tanner Boyajian, Newbury Park, CA (US); Hunter Boyajian, Simi Valley, CA (US); Chase Boyajian, Phoenix, AZ (US); Cliff Elion, Westlake Village, CA (US); Jimmy Huey, Marrakesh (MA)

(73) Assignee: Dark Arcade Theater, LLC, Studio City, CA (US)

( * ) Notice: Subject to any disclaimer, the term of this patent is extended or adjusted under 35 U.S.C. 154(b) by 176 days.

(21) Appl. No.: 18/696,987

(22) PCT Filed: Oct. 14, 2022

(86) PCT No.: PCT/US2022/046789
§ 371 (c)(1),
(2) Date: Mar. 28, 2024

(87) PCT Pub. No.: WO2023/064603
PCT Pub. Date: Apr. 20, 2023

(65) Prior Publication Data
US 2025/0039493 A1      Jan. 30, 2025

Related U.S. Application Data

(60) Provisional application No. 63/256,440, filed on Oct. 15, 2021.

(51) Int. Cl.
*H04N 21/43*        (2011.01)
*A63F 13/50*        (2014.01)
(Continued)

(52) U.S. Cl.
CPC ....... *H04N 21/43076* (2020.08); *A63F 13/50* (2014.09); *G06F 3/165* (2013.01); *H04N 7/15* (2013.01)

(58) Field of Classification Search
CPC ...... A63F 13/50; A63F 13/285; G06F 3/0412; G06F 3/165; G06F 16/48; G06F 16/64; (Continued)

(56) References Cited

U.S. PATENT DOCUMENTS 7,620,363 B2 * 11/2009 Spurgat ................ G11B 27/105
455/418
9,154,846 B2 * 10/2015 Limbasia ............. H04N 21/472
(Continued)

OTHER PUBLICATIONS

Amiri et al., "Camera-based Video Synchronization for a Federation of Mobile Projectors," CVPR 2011 WORKSHOPS, conference date: Jun. 20-25, 2011, retrieved from the Internet, https://ieeexplore. jeee.org/stamp/stamp.jsp?tp=&amumber-5981744, 11 pages.
(Continued)

*Primary Examiner* — Gerald Gauthier
(74) *Attorney, Agent, or Firm* — Womble Bond Dickinson (US) LLP

(57) ABSTRACT

A method and system for synchronized playback of different audio inputs to different players includes accessing a script by an engine, wherein the script includes locations of media files associated with character roles; creating a mediaplayer in the engine based on the script; loading instances of the engine by a moderator and players, associating each character role with a player; and transmitting a message to the players wherein each player substantially simultaneously receives a different media file, which includes: triggering the mediaplayer, wherein the mediaplayer includes information regarding which character role is associated with which player and includes the locations of the media files; determining which media file is to be sent to which player based
(Continued)

on the character role for each player; sending the location of the media file to the player associated with respective character role; and receiving and playing or viewing the media files by the players.

12 Claims, 7 Drawing Sheets

(51) Int. Cl.
  *G06F 3/16* (2006.01)
  *H04N 7/15* (2006.01)

(58) Field of Classification Search
  CPC .... G06F 16/683; G06F 40/18; G07F 17/3204; G11B 20/10527; G11B 27/105; G11B 27/11; H04L 5/14; H04L 9/40; H04L 69/28; H04N 7/15; H04N 21/23424; H04N 21/43076; H04N 21/436; H04N 21/43615; H04N 21/439; H04N 21/4402; H04N 21/443; H04N 21/472; H04N 21/6543; H04N 21/6587; H04N 21/84; H04R 1/406; H04R 3/04; H04W 88/04; H04W 4/024; G10L 15/02; G10L 15/26; G10L 25/57; H04H 60/80; H05B 47/105
  See application file for complete search history.

(56) References Cited

U.S. PATENT DOCUMENTS

| | | | | | |
|---|---|---|---|---|---|
| 9,183,500 | B2 * | 11/2015 | Lamb | | G11B 27/11 |
| 9,378,611 | B2 * | 6/2016 | Powell | | G07F 17/3204 |
| 9,763,021 | B1 * | 9/2017 | Peeler | | H05B 47/105 |
| 10,296,283 | B2 * | 5/2019 | Millington | | G06F 3/0484 |
| 11,051,059 | B2 * | 6/2021 | Dodson | | H04N 21/6543 |
| 11,647,248 | B2 * | 5/2023 | Romey | | H04N 21/84 |
| | | | | | 725/86 |
| 2005/0028225 | A1 * | 2/2005 | Dawson | | H04N 21/436 |
| | | | | | 725/147 |
| 2005/0210101 | A1 * | 9/2005 | Janik | | H04N 21/443 |
| | | | | | 709/203 |
| 2005/0286546 | A1 * | 12/2005 | Bassoli | | H04W 88/04 |
| | | | | | 370/503 |
| 2008/0119953 | A1 * | 5/2008 | Reed | | G06F 16/64 |
| | | | | | 707/E17.009 |

| | | | | | |
|---|---|---|---|---|---|
| 2009/0106357 | A1 * | 4/2009 | Igelman | | H04L 69/28 |
| | | | | | 709/203 |
| 2010/0151783 | A1 * | 6/2010 | Cohen | | H04H 60/80 |
| | | | | | 455/3.06 |
| 2012/0253795 | A1 * | 10/2012 | Andrews | | G10L 15/26 |
| | | | | | 704/201 |
| 2013/0084912 | A1 * | 4/2013 | Lindner | | H04L 5/14 |
| | | | | | 455/518 |
| 2013/0174204 | A1 * | 7/2013 | Coburn, IV | | H04N 21/43615 |
| | | | | | 725/78 |
| 2014/0181173 | A1 * | 6/2014 | Millington | | G11B 20/10527 |
| | | | | | 709/201 |
| 2014/0277638 | A1 * | 9/2014 | Smith | | G06F 16/683 |
| | | | | | 700/94 |
| 2015/0221339 | A1 * | 8/2015 | Snibbe | | H04N 21/23424 |
| | | | | | 386/285 |
| 2015/0286360 | A1 * | 10/2015 | Wachter | | G06F 3/0412 |
| | | | | | 345/173 |
| 2016/0080682 | A1 * | 3/2016 | Diaz | | A63F 13/285 |
| | | | | | 386/227 |
| 2016/0216880 | A1 * | 7/2016 | Millington | | G06F 16/63 |
| 2016/0216937 | A1 * | 7/2016 | Millington | | H04L 65/611 |
| 2016/0216938 | A1 * | 7/2016 | Millington | | G06F 3/04847 |
| 2016/0323608 | A1 * | 11/2016 | Bloch | | H04N 21/6587 |
| 2016/0323702 | A1 * | 11/2016 | Labrie | | H04W 4/024 |
| 2017/0097803 | A1 * | 4/2017 | Herlöfsson | | H04R 3/04 |
| 2017/0118529 | A1 * | 4/2017 | Dietrich | | H04L 9/40 |
| 2018/0061458 | A1 * | 3/2018 | Harwood | | H04N 21/440281 |
| 2018/0253277 | A1 * | 9/2018 | Millington | | H04N 9/7904 |
| 2020/0084580 | A1 * | 3/2020 | Labrie | | G06F 3/165 |
| 2020/0179801 | A1 | 6/2020 | Pepper | | |
| 2020/0252678 | A1 * | 8/2020 | Elliot | | H04N 21/439 |
| 2021/0342785 | A1 * | 11/2021 | Mann | | G06F 40/18 |
| 2022/0040572 | A1 * | 2/2022 | Nagendran | | G06F 3/165 |
| 2022/0092109 | A1 * | 3/2022 | Li | | G10L 15/02 |
| 2022/0109944 | A1 * | 4/2022 | Fan | | H04R 1/406 |
| 2025/0039493 | A1 * | 1/2025 | Schectman | | G06F 3/165 |

OTHER PUBLICATIONS

Wijnants et al., "Synchronous MediaSharing: Social and Communal Media Consumption for Geographically Dispersed Users"; MM Sys '12: Proceedings of the 3rd Multimedia Systems Conference, retrieved from the Internet on Dec. 29, 2022, https://dl.acm.org/doi/pdf/10.1145/2155555.215557 4, 6 pages.
International Preliminary Report on Patentability for International Application No. PCT/US2022/046789, mailed Apr. 25, 2024, 8 pages.

\* cited by examiner

FIG. 4

| Type | Description | Button | Group | Player 1 | Player 2 | Player 3 | Player 4 | Player 5 | Player 6 |
|---|---|---|---|---|---|---|---|---|---|
| Title | Create Room | Show | visual | Art/Homepage.png | Art/Homepage.png | Art/Homepage.png | Art/Homepage.png | Art/Homepage.png | Art/Homepage.png |
| Music | Background Music | Play | audio | Audio/Music.mp3 | Audio/Music.mp3 | Audio/Music.mp3 | Audio/Music.mp3 | Audio/Music.mp3 | Audio/Music.mp3 |
| Overlay | Object Selection | Show | visual | Art/TS_Overlay.png | Art/TS_Overlay.png | Art/TS_Overlay.png | Art/TS_Overlay.png | Art/TS_Overlay.png | Art/TS_Overlay.png |
| Overlay | Intro | Show | visual | Art/I1.png | Art/I2.png | Art/I3.png | Art/I4.png | Art/I5.png | Art/I6.png |
| Sound | Intro | Play | audio | Audio/I1.mp3 | Audio/I2.mp3 | Audio/I3.mp3 | Audio/I4.mp3 | Audio/I5.mp3 | Audio/I6.mp3 |
| Overlay | Act 1 | Show | visual | Art/A11.png | Art/A12.png | Art/A13.png | Art/A14.png | Art/A15.png | Art/A16.png |
| Sound | Act 1 | Play | audio | Audio/A11.mp3 | Audio/A12.mp3 | Audio/A13.mp3 | Audio/A14.mp3 | Audio/A15.mp3 | Audio/A16.mp3 |
| Overlay | Act 2 | Show | visual | Art/A21.png | Art/A22.png | Art/A23.png | Art/A24.png | Art/A25.png | Art/A26.png |
| Sound | Act 2 | Play | audio | Audio/A21.mp3 | Audio/A22.mp3 | Audio/A23.mp3 | Audio/A24.mp3 | Audio/A25.mp3 | Audio/A26.mp3 |
| Overlay | Act 3 | Show | visual | Art/A31.png | Art/A32.png | Art/A33.png | Art/A34.png | Art/A35.png | Art/A36.png |
| Sound | Act 3 | Play | audio | Audio/A31.mp3 | Audio/A32.mp3 | Audio/A33.mp3 | Audio/A34.mp3 | Audio/A35.mp3 | Audio/A36.mp3 |

Figure 7:
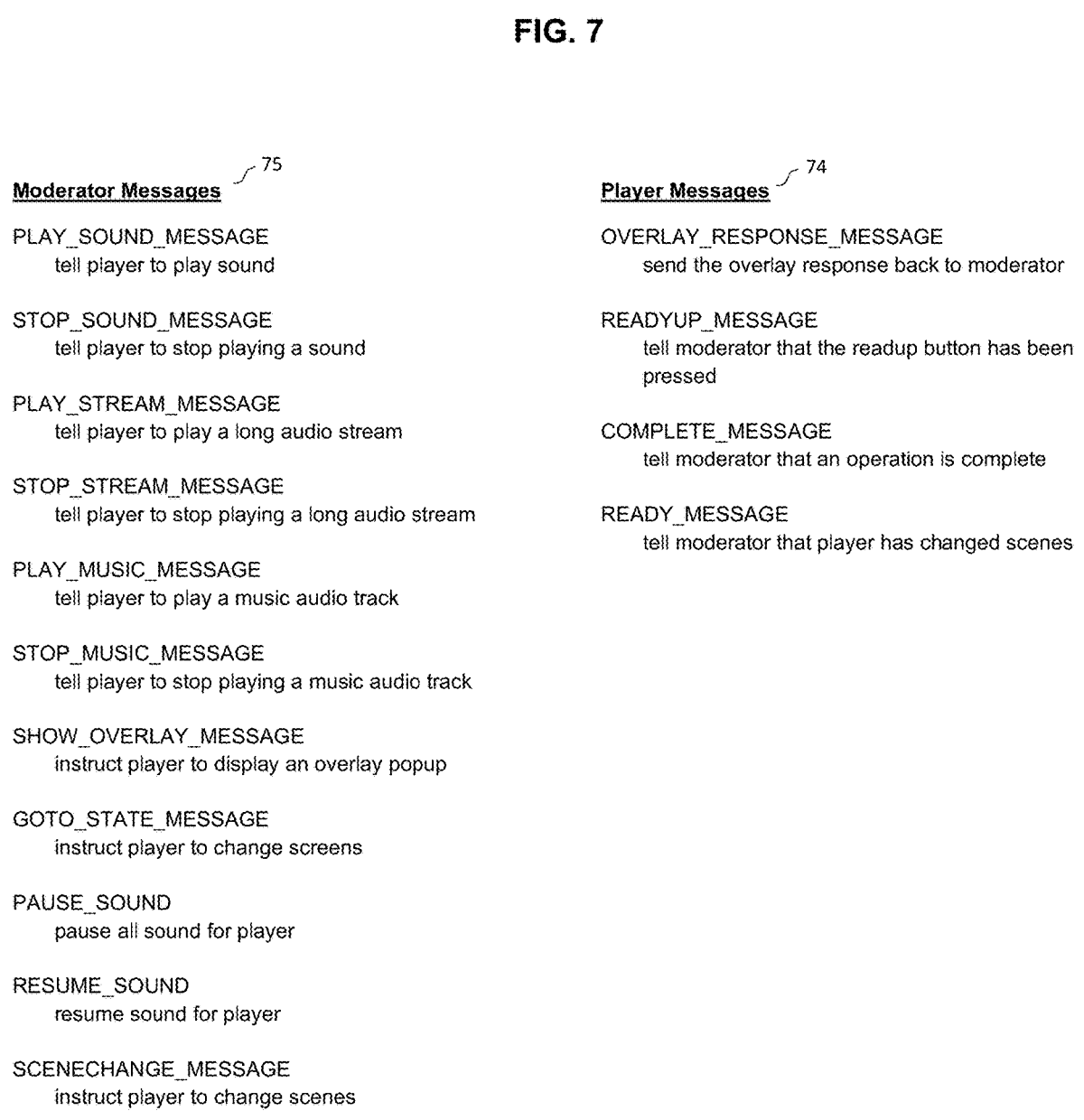

Moderator Messages ⟋ 75

PLAY_SOUND_MESSAGE
    tell player to play sound

STOP_SOUND_MESSAGE
    tell player to stop playing a sound

PLAY_STREAM_MESSAGE
    tell player to play a long audio stream

STOP_STREAM_MESSAGE
    tell player to stop playing a long audio stream

PLAY_MUSIC_MESSAGE
    tell player to play a music audio track

STOP_MUSIC_MESSAGE
    tell player to stop playing a music audio track

SHOW_OVERLAY_MESSAGE
    instruct player to display an overlay popup

GOTO_STATE_MESSAGE
    instruct player to change screens

PAUSE_SOUND
    pause all sound for player

RESUME_SOUND
    resume sound for player

SCENECHANGE_MESSAGE
    instruct player to change scenes

Player Messages ⟋ 74

OVERLAY_RESPONSE_MESSAGE
    send the overlay response back to moderator

READYUP_MESSAGE
    tell moderator that the readup button has been pressed

COMPLETE_MESSAGE
    tell moderator that an operation is complete

READY_MESSAGE
    tell moderator that player has changed scenes

FIG. 8

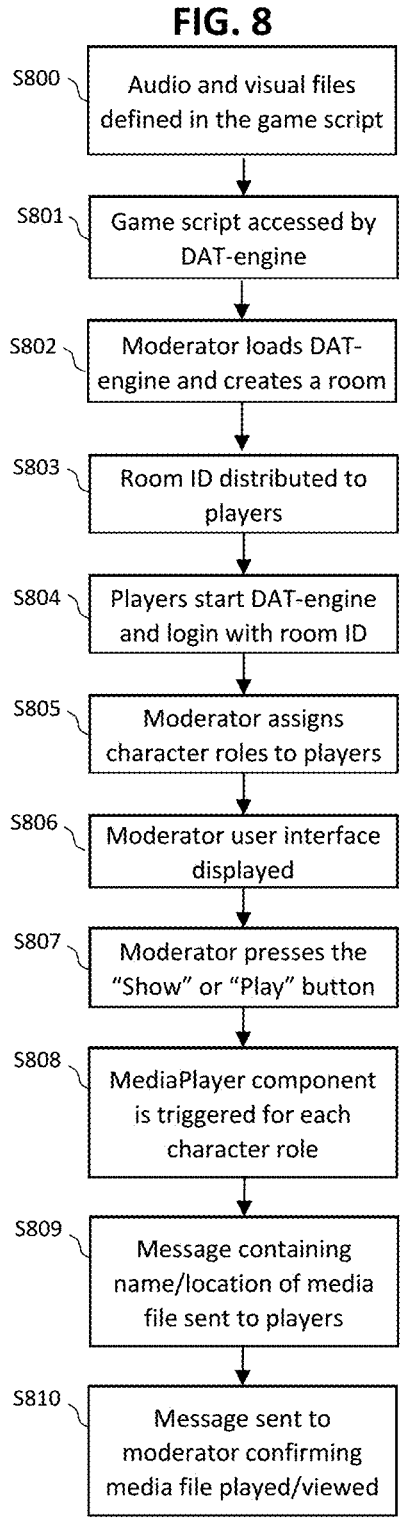

S800 — Audio and visual files defined in the game script

S801 — Game script accessed by DAT-engine

S802 — Moderator loads DAT-engine and creates a room

S803 — Room ID distributed to players

S804 — Players start DAT-engine and login with room ID

S805 — Moderator assigns character roles to players

S806 — Moderator user interface displayed

S807 — Moderator presses the "Show" or "Play" button

S808 — MediaPlayer component is triggered for each character role

S809 — Message containing name/location of media file sent to players

S810 — Message sent to moderator confirming media file played/viewed

1

METHOD FOR SIMULTANEOUSLY SENDING DIFFERENT MEDIA INPUTS TO DIFFERENT USERS

CROSS REFERENCE TO RELATED APPLICATIONS

This application is a U.S. National Phase entry under 35 U.S.C. § 371 and claims priority to International Patent Application No. PCT/US2022/046789, filed on Oct. 14, 2022, which claims priority to and the benefit of U.S. Provisional Patent Application No. 63/256,440, filed Oct. 15, 2021, the entire contents of each of which are herein incorporated by reference.

BACKGROUND

1. Field

The present disclosure relates to a system and method for initiating synchronized playback of different media files to different users.

2. Description of the Related Art

Cooperative and interactive games allow players to interact to either work together to solve a game or to work in opposition to each other to win the game as an individual. Many such games are played in person. However, as concerns over pandemic viruses have increased due to the rise of COVID, there is an increasing demand for cooperative and interactive games that can be played by players at remote locations from each other. Further, in cooperative and interactive games that are capable of being played remotely, it is typical for all the players to receive the same information, e.g., the same audio and media.

For example, entertainment products offered by Tokyo's Joyopolis amusement park and Darkfield Radio employ streaming audio to multiple participants at the same time to create a theatrical experience. In both of these cases, the audio content delivered to each participant is the same, nor is there any way for the participants to send inputs back to the system that informs what takes place during the course of the event.

Cooperative and interactive games in which different audio and or media can be sent to the players can help create a unique playing experience for the players, and allow for a more complex game interaction.

The information in this Background is for enhancing the understanding of the background of the art and as such, it may contain information that is not prior art.

SUMMARY

Aspects of one or more embodiments of the present disclosure are directed towards a system and method for initiating synchronized playback of different media files to different users.

Additional aspects will be set forth in part in the description that follows and, in part, will be apparent from the description, or may be learned by practice of the presented embodiments of the disclosure.

Embodiments of the present disclosure provide a method for synchronized playback of different audio inputs to different players including: accessing a script by an engine, wherein the script comprises locations of media files associated with character roles and each respective character role of the character roles is associated with a different media file of the media files; creating a mediaplayer component in the engine based on information from the script; loading an instance of the engine by a moderator; loading other instances of the engine by players, associating each respective character role with a respective one of the players; and transmitting a message to the players wherein each of the players substantially simultaneously receives a different media file of the media files, comprising: triggering the mediaplayer component, wherein the mediaplayer component comprises information regarding which of the character roles is associated with which of the players, and comprises the locations of the media files associated with each of the character roles; determining which of the media files is to be sent to which of the players based on the character roles associated with each of the players; sending each respective location of the locations of the media files to the respective one of the players that is associated with each respective character role to which the different media file associated; and receiving and playing or viewing the media files by the players.

Embodiments of the present disclosure also provide a computer readable medium including stored instructions, which when executed by a processor, cause the processor to initiate synchronized playback of different audio inputs to different players according to the above method.

Embodiments of the present disclosure also provide a system for synchronized playback of different media inputs performed by a computing apparatus including at least one processor, the system including: means for accessing a script by an engine, wherein the script includes locations of media files associated with character roles and each respective character role of the character roles is associated with a different media file of the media files; means for creating a mediaplayer component in the engine based on information from the script; means for loading an instance of the engine by a moderator; means for loading other instances of the engine by players, means for associating each respective character role with a respective one of the players; and means for transmitting a message to the players wherein each of the players substantially simultaneously receives a different media file of the media files, including: means for triggering the mediaplayer component, wherein the mediaplayer component includes information regarding which of the character roles is associated with which of the players, and includes the locations of the media files associated with each of the character roles; means for determining which of the media files is to be sent to which of the players based on the character roles associated with each of the players; means for sending each respective location of the locations of the media files to the respective one of the players that is associated with each respective character role to which the different media file associated; and means for receiving and playing or viewing the media files by the players.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and, together with the description, serve to explain principles of the present disclosure. In the drawings:

FIG. 4 is a diagram of a portion of a game script used in the game system, according to one or more embodiments of the present disclosure.

FIG. 7 shows examples of moderator and player messages that may be used by the game software in embodiments of the present disclosure.

FIG. 8 is a flow chart showing a method for initiating synchronized playback of different media files to different users according to embodiments of the present disclosure.

DETAILED DESCRIPTION

Figure 1:
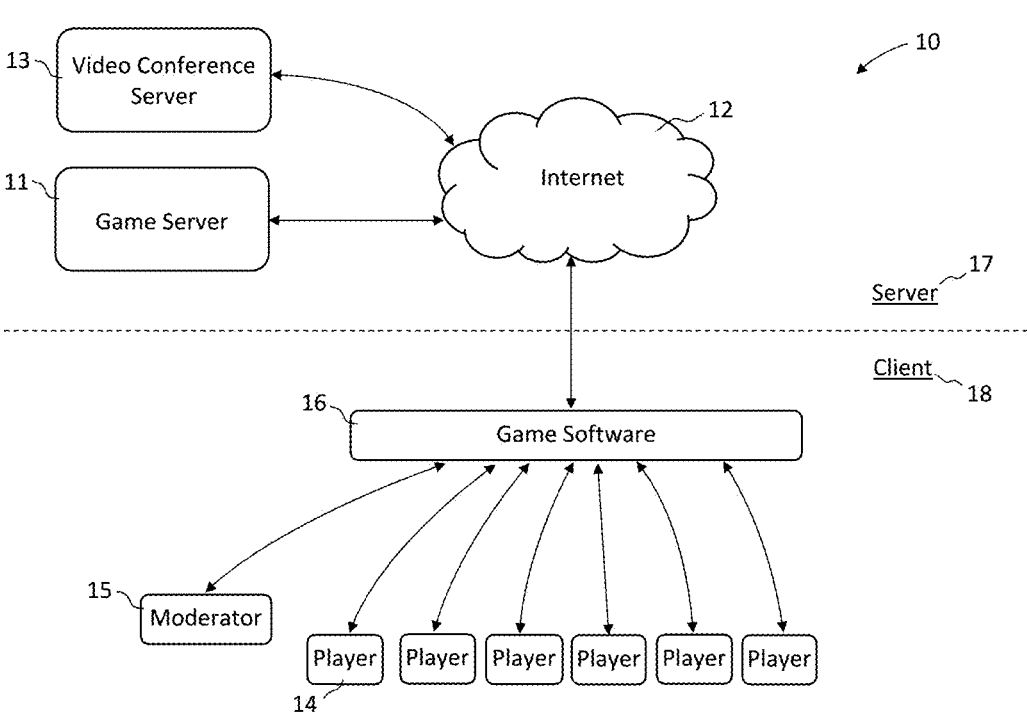
FIG. 1 is a schematic diagram of the overarching structure of a multiplayer, cloud-based game system according to embodiments of the present disclosure.

Hereinafter, example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, steps, elements, and/or components, but do not preclude the presence or addition of one or more other features, steps, elements, components, and/or groups thereof. As used herein, the term "and/or" includes any and all combinations of one or more of the associated listed items.

Further, the use of "may" when describing embodiments of the present disclosure refers to "one or more embodiments of the present disclosure."

As used herein, the term "substantially," "about," "near," and similar terms are used as terms of approximation and not as terms of degree, and are intended to account for the inherent deviations in transmission times as would be recognized by those of ordinary skill in the art. For example, transmission times may vary based on the internet connection of the users/players, the computer hardware and computer settings of the users/players, and the user's/player's distance from the server transmitting the data.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the current disclosure provide an interactive and collaborative game with game play controlled by a scripted game engine as well as coordinated 'live' (e.g., real-time) communications between the players. The 'live' sessions between players allow voice and video communication between all or selected players throughout or during different parts of the game. The players can discuss in real time the information that they have been provided to solve a puzzle and/or other game.

The game engine may set up scenes via audio and image information streamed and/or displayed to individual players. During the game, each player may simultaneously receive distinct audio, image, and/or other media data streams or files. The media files may be synchronized to be sent to each player at substantially the same time. These media files may be used to create different points of view for each player regarding the objective of the game. For example, each player may be a different character in a murder mystery game. In some embodiments of the game, the players are participating in a virtual theatrical performance, with the different media files (including audio and visual files) being sent to the players being tailored to the character role that the player will be playing and/or acting out as part of the game.

FIG. 1 is a schematic diagram of the overarching structure of a multiplayer, cloud-based game system 10 according to embodiments of the present disclosure.

The game system 10 may allow players 14 to interact in real-time over the internet 12 to play an interactive game in which each player receives distinct inputs, such as media inputs or files, simultaneously or near simultaneously. Participants of the game, i.e., players 14, are connected to a game server 11 over the internet 12 via game software 16. The game software 16 may include and/or utilize various communications protocols to allow the players 14 to communicate with each other via the game server 11 over the internet 12.

The game server 11 may be an internet-based server to help provide a foundation on which to build game attributes, such as rooms and/or user graphics. The game server 11 allows for multiplayer communication over the internet 12. In the current embodiment, the game server 11 can be hosted on a commercially available cloud-based server, such as Linode or any other suitable cloud-based server. However, the embodiments are not so limited, and the game server may be locally hosted, hosted on a proprietary cloud-based host computer or a combination of different servers.

The game server 11 may work in conjunction with a video conference server 13. The video conference server 13 may be a commercially available video conferencing server, such as Zoom, Microsoft Teams, or another suitable commercial video conferencing server, or may be an in-house or third-party built video conferencing server. In some embodiments, the video conference server 13 may be integrated with the game server 11. Communications between live players 14 and a moderator 15 are implemented using the video conference server 13. In some embodiments, the game can be played in-person without the use of the video conference server 13.

The moderator 15 and the players 14 each run an implementation of the game software 16. The game software 16 may be packaged as an application, such as by using a third-party module bundler such as Webpack (which packages the game as a web-app) or other suitable bundler, and individually downloaded to the moderator 15 and each of the players 14 computer or mobile device when they connect to the game URL. In some embodiments, the game software may be downloaded as multiple files or some assets (e.g., media files, including visual files and audio files) may be downloaded and others may be streamed. For example, large files, including for example large audio files, may be streamed. The game software 16 may be packaged in any suitable format to allow the players 14 and moderator 15 to download the application. Each player 14, and the moderator 15, who likewise may download a copy of the game software 16, may run a local, individual copy of the game software 16. The implementation of the game software 16 run by the moderator 15 may be different from the implementation run by the players 14. In some embodiments, the game software 16 may by streamed to the moderator 15 and players 14. In some embodiments, the game software 16 can run inside a client side video conferencing software, such as inside a video conferencing application, as a web-view. For example, the game software 16 may be run inside of Zoom® Apps as a web-view in the Zoom client. Zoom® is a registered trademark owned by Zoom Video Communications, Inc., a Delaware corporation.

A server side (or backend) 17 of the game system 10 can include the video conference server 13 and the game server 11, both of which can be interconnected via the internet 12. A client side (or front end) 18 of the game system 10 can include the game software 16, the moderator 15 and players 14, which are connected to the server side 17 via various protocols and modules within the game software 16 and which may incorporate various commercial, third-party or proprietary packages for functionality and/or media access.

In the current embodiment, game play is paced by a human moderator as the moderator 15. In some embodiments, the moderator 15 may login to a moderator page and may be presented with a user interface (UI) that allows the moderator 15 to control the game flow. This moderator user interface 35 may be created by the game software 16 (see, e.g., FIG. 3) and may be the moderator's control panel for the game. From the moderator user interface 35, the moderator 15 can initiate the playing or streaming of video and audio data to the players 14 during the progression of the game and initiate scene changes within the game. Audio and video data transmitted to the players 14 may be controlled/initiated by the moderator 15, for example, audio and data may be transmitted to the players 14 in response to button press commands from the moderator 15. Simple, one-button commands initiated by the moderator 15 can allow a different audio and/or video cues to be sent to each of the players 14. The moderator user interface 35 may also allow control of the game evolution by progressing through various game features (see, e.g., game features 42 discussed in more detail below).

Using the video conference server 13, the moderator 15 can also control the communication between players 14. At certain key points in the game, players 14 may be separated into groups allowing discussions to occur in 'private,' which can help add to the tension in the game. These separate chat rooms or private groups created via the video conference server 13 will allow the players to only hear what is happening in their group. In some embodiments, the moderator 15 may be in audio and video communication with the players 14, e.g., constant audio and video communication, via the video conference server 13 facilitating interaction and curated discussion between the players 14.

In another configuration of the game, the moderator 15 may be replaced with an automated software moderator. The software moderator may follow the same script as the human moderator.

The number of players 14 that the game system 10 can accommodate can vary widely depending on the game play. While six players 14 are shown in the embodiment of FIG. 1, the game system 10 is not limited thereto and the number of players can include between 2 and 20 players, for example, or more. In some embodiments, the number of players can be 2 or more, 4 or more, or 6 or more. In some embodiments, the players 14 may login to the game server 11 and may be presented with a login screen that allows them to enter their name and/or a username. Once all players 14 are logged in and the moderator 15 has created the game room, the moderator 15 may provide a room ID, such as a globally unique identifier (GUID), to each player 14 who may then enter the room ID into their login form to enter the game.

Figure 2:
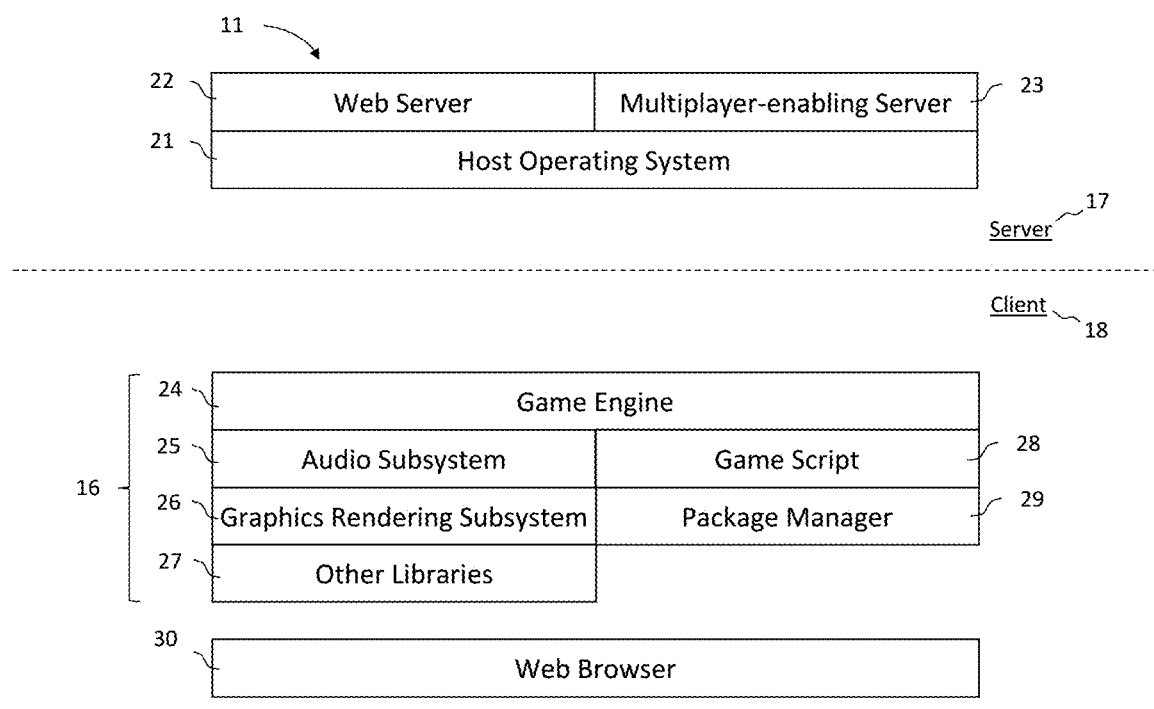
FIG. 2 is a schematic diagram showing a game server and game software that may be included in the game system according to embodiments of the present disclosure.
Figure 3:
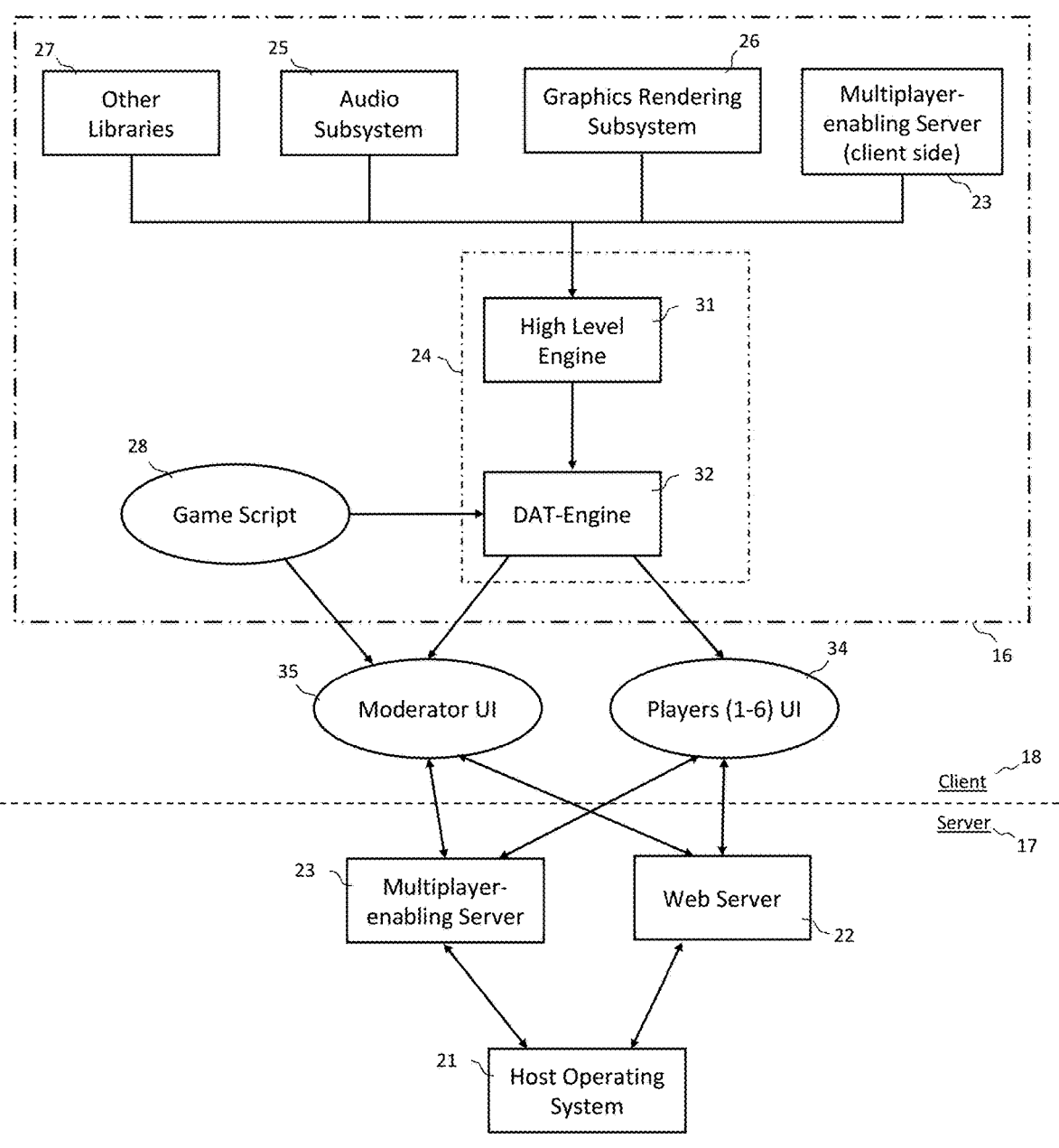
FIG. 3 is a schematic diagram showing the interrelationship of various modules included within the game server and game software in embodiments of the present disclosure.

FIG. 2 is a schematic diagram showing the game server 11 and game software 16 that may be included in the game system 10. FIG. 3 is a schematic diagram showing the interrelationship of the various modules included within the game server 11 and the game software 16 in embodiments of the present disclosure.

On the server side 17, the game server 11 may include a host operating system 21 which may run a web server 22 and multiplayer-enabling server 23. The host operating system 21 may be a commercially available host operating system 21 such as Ubuntu for a Linux-based system. Other host operating system may be used that may be Windows or MacOS-based, for example, or other suitable Linux-based operating systems may also be used. In some embodiments, other server configurations are possible, such as a self-hosted (on premises) server or multiple servers for load balancing (including self-hosted and/or commercially-hosted servers).

The web server 22 may be a server that enables the running of a website and may host the game software 16. For example, the commercially available Apache Web Server may be used, or another suitable web server.

The multiplayer-enabling server 23 may be a multiplayer server that allows a client to tie in multiple players 14 and to create rooms for video and/or audio conferences to take place in in combination with the video conference server 13. The multiplayer-enabling server 23 may also allow chats and/or other private (e.g., visible to only select players 14) and/or public (e.g., visible by all the players 14 and/or the moderator 15) messaging between the players 14. For example, the multiplayer-enabling server 23 may allow individual players 14 to send private messages to each other during game player to communicate about various issues in the game, e.g., to help solve the game puzzles. In some embodiments, the multiplayer-enabling server 23 may include the Smartfox Server 2x or other suitable multiplayer-enabling server.

On the client side 18, the game software 16 may include several interconnected software modules, which may include off-the-shelf (OTS) modules, as well as a game engine 24 and game script 28. The game software 16 may include the game engine 24, an audio subsystem 25, a graphics rendering subsystem 26, other libraries 27, the game script 28 and a package manager 29. While the game engine 24, audio subsystem 25, graphics rendering subsystem 26, other libraries 27, the game script 28 and the package manager 29 are shown in FIG. 2 as being on the client side 18, the present disclosure is not limited thereto.

For example, the package manager 29 may not be on the client side 18, but may be an external software that compiles the final package that is saved on the game server 11 (e.g., the web server 22). The final package is the packaged game software 16, including the DAT-engine 32, that is downloaded and run by the players 14 and moderator 15.

The audio subsystem 25 may store and render various audio files that may be used during game play that may be triggered for play by the moderator 15. The audio subsystem 25 may include commercially available audio libraries, such as open-source JavaScript audio libraries like the Howler Media server (which also serves as a sound driver), other HTML5 audio libraries like Amplitudejs, Waud, and Soundcloud Audio.js, and/or it may be a library created in-house or by a third party to store various audio files for use in the game. In some embodiments, the audio subsystem 25 may be a sound playback engine.

The graphics rendering subsystem 26 may allow the rendering and display of various graphics files that may be used during game play, and queued and initialized for display by the moderator 15. The graphics rendering subsystem 26 may include commercially or open-source available graphics rendering engines, such as JavaScript graphics rendering engines like Pixi.JS (which may require an MIT license) or may be a graphics rendering engine created in-house or by a third party. In some embodiments, the graphics rendering subsystem 26 may be a browser 2d WebGL rendering engine and may be either open source or proprietary.

Other libraries 27 may include additional audio, visual, both (e.g., video), font, or the like, libraries that include media or other files that can be used to contribute to the look and feel of the game system's aesthetic in combination with the other subsystems above.

The game script 28 may define the features of the game (see, e.g., game features 42 discussed with respect to FIGS. 5-6 below), including the story and the media files that will be visible and/or audible to the players 14 during the game. The game script 28 contains code and declarations that define user interfaces for the game that can be run by the game engine 24. The game script 28 specifies the user interface components used by the moderator user interface 35 and the player user interfaces 34, discussed in more detail below. The order of user interface components in the game script 28, and consequently the moderator user interface 35, controls the order of the events in the game presented by the moderator 15. Changing the game script 28, or creating different game scripts, can create alternate games that can be run by the game engine 24, for example, run on other web sites dedicated to those specific games. In the current embodiment, the game system 10 is run on SavageHall.com.

The game script 28 may be an XML (e.g., XML-based UI markup language) in its native form, so that it can be read by the game engine 24. While it is possible to create the game script directly in XML, it is not ideal because XML is not particularly user-friendly. The game script 28 may be created in a spreadsheet format and converted to XML (e.g., XML-based UI markup language) by, for example, a python script, so that the game software 16 (e.g., the DAT-engine 32, discussed in more detail below) can access and execute the game script 28. The DAT-engine 32 may iterate through all the XML nodes and create the moderator user interface 35, discussed in more detail below. In some embodiments, the data from the spreadsheet may be hardcoded into the game code of the DAT-engine 32, or a program may be used instead of hardcoding. However, the present disclosure is not limited thereto. The game script may be created directly in XML or any other suitable format and may be imported into the game software 16 in any suitable format that can be read by the DAT-engine 32. In some embodiments, the game script 28 may be created by a custom editor that allows the user to input data and drag-and-drop files in a user-friendly manner.

The game script 28 may specify which files, including media files, that the players 14 will see and experience during the game play. The game script 28 may lay out the audio, visual and/or other media files that are uniquely seen by each of the players 14. In the current embodiment, game script is the Savage Hall script. The game script 28 may be loaded by the moderator 15 (e.g., loaded by the moderator instance of the DAT-engine 32 being run on the moderator's browser) and may not be accessible to the players 14.

FIG. 4 is a diagram of a portion of the game script 28, according to one or more embodiments of the present disclosure. In the present embodiment, the game script 28 is in a spreadsheet format (such as an excel or google spreadsheet); however, embodiments of the present disclosure on not limited thereto. The game script 28 may be created in any suitable format, including, but not limited to, a text document and/or any suitable graphical form. In the present embodiment, the game script 28 is a google spreadsheet that is converted by a python script to XML (e.g., an XML-based user interface markup language) used by the game software 16, e.g., the DAT-engine 32 of the game software 16.

The game script 28 may defined in the rows of the spreadsheet, with each row being a game feature (e.g., game features 42 described in more detail below) at a different stage (or step) of the game. Each step may have different audio files and/or image files and the names of the audio files and image files may be embedded as attributes. In other words, the game script 28 is organized as a series of game steps. In the present embodiment, the rows are organized in chronological order based on the order in which the game features 42 (discussed in more detail with respect to FIGS. 5-6 below) should appear in the game, with each row representing a different game feature 42. The DAT-engine 32 iterates through the game features 42 (e.g., the rows) of the moderator user interface 35 to access and initiate each game feature 42 of the game. However, the present disclosure is not limited thereto and the game script 28 may be organized in any suitable format.

In the present embodiment, the header row 41 may include descriptions of what each column contains, and each following row may include a game feature 42 and the media file(s) associated with that game feature 42. The media files linked to the game features 42 may include music or other audio cues, images, videos and/or graphical displays for a specific part of the game (e.g., Act 1, Act, 2, etc.). Hereinafter, music, sounds and other audio will be referred to as audio files and images and other graphical displays will be referred to as visual files. In some embodiments, videos may be treated the same as audio, as video files needed to be played or streamed. In other embodiments, videos are treated as a separate category of file. These media files may be stored on the web server 22 and are loaded and/or streamed from the audio subsystem 25, the graphics rendering subsystem 26, or other libraries 27. The media files may be accessed by the DAT-engine 32 and pushed to the players 14 through the high-level engine 31 (using resource loaders from the audio subsystem 25 and/or the graphics rendering subsystem 26). In other embodiments, the visual files may be stored locally, in the audio subsystem 25, the graphics rendering subsystem 26, and/or in other libraries 27, and may be access and pushed to the players by the DAT-engine 32.

For example, a first row of game features 42 may include artwork (e.g., a visual file) to be shown to the players 14 during the opening "Title" page of the game. In the present embodiment, the artwork shown to the players 14 on the opening "Title" page is the same for all the players 14. However, the artwork may differ for some or all the players 14. For example, in the game feature 42 row for the "Scene Overlay" for "Act 1," each of the players 14 receives a different visual (e.g., art) file. An overlay represents a visual file that can be superimposed over a player's screen/browser window. It may also include interactive features, such as multiple-choice questions.

As labeled in the header row 41, a type column 50 may be included that provides the type of file for each row (e.g., what type of audio or visual file(s) that row includes as it relates to the game. This type information may be used by the DAT-engine 32 to send messages between the moderator 15 and the players 14, as discussed in more detail with respect to FIG. 7 below. File types in the type column 50 may include types of audio files, such as sounds, music, or long audio streams (e.g., stream), and types of visual files, such as overlays.

A description column 51 may be included that provides a description of the file in each row (e.g., what part of the game the game feature 42 in that row pertains to). A button column 52 may be included to designate the type of button to appear on the moderator user interface 34 for that row (described in more detail with respect to FIGS. 5 and 6 below). A group column 53 may be included that defines the group (e.g., audio or visual) into which the game feature 42 in that row falls into, and the character roles columns 54 may be used to designate the specific files that will be received by each player 14 for each game feature 42. For example, for the "Audio" of "Act 2," Player 1 will receive the audio file "A21.mp3" stored in the "Audio" folder. Players 2-6 will receive the audio files "A22.mp3"-"A26.mp3," respectively, also stored in the "Audio" folder. The game script 28 designates which files will be received by which player 14 during each and every part of the game. The game script 28 may be easily accessed and edited to facilitate changes to the game play and/or to easily create new games by simply filling the game features of the new game into the game script form. While the embodiment of FIG. 4 includes type, description, button and group columns 50-54, the present disclosure is not limited thereto. For example, the group column may not be provided and the information regarding whether the media files are audio or visual may be determined based on the information provided in the button column 52 and/or the type column 50. Further, other columns may be included based on needed or desired features for the game.

While FIG. 4 only includes eleven game features 42, the present disclosure is not limited thereto. The game script 28 can include as many or as little game features as needed or desired to represent the game.

In some embodiments, the game script 28 can have a custom layout created by a custom editor in which various files can be uploaded, and/or dragged and dropped into the interface, or otherwise incorporated into the game script 28 for use, display, or playing during the game play and the game script 28 may later be compiled to XML or other suitable format for use by the game engine 24. Rulesets, ordering, and clickable options could also be modified in the moderator's interface so that it would change the sequencing of what the players sees and hears (e.g., the sequencing of game features 42 described in more detail below). The custom layout may be based on a Box, VBox (items arranged vertically), HBox (items arranged horizontally), XGridRow, Spacer or XMLBox nested container systems. The custom layout can be declarative and defined using XML. (e.g., similar to Adobe Flex MXML and React JSX). Additional features may include the capability to display text buttons, sprites, animated sprites or other programmatic animation, and the components can be ordered or have absolute positioning (for example, absolute positioning based on percentages). In such embodiments, the game script may be provided as an external software package (e.g., a web-based app or native desktop app) that will allow an end-user to create the game script via drag and drop operations and/or simple choice-based questions. The software package may have a custom layout and may be built on a high level engine, such as the high-level engine 31 discussed in more detail below.

Referring back to FIGS. 2 and 3, the package manager 29 may allow for automatic installation, compiling and/or management of external libraries, such as those used in the audio subsystem 25, the graphics rendering subsystem 26 and the other libraries 27 above. The package manager 29 may also include a repository of libraries itself. The package manager 29 may be an external tool used to package the code (e.g., all the code) used by the game, including, for example, the game engine 24, the audio subsystem 25, the graphics rendering subsystem 26 and the other libraries 27. The audio subsystem 25, the graphics rendering subsystem 26 and the other libraries 27 can be installed from the package manager 29. For example, open source node.js may be used as the package manager 29 and node.js includes a repository has thousands of 3rd party libraries that can be included into an application in addition to being a package manager. However, the present disclosure is not limited thereto, and any other suitable package manager, open source or proprietary, may be used.

The client side 18 may also include a web browser 30, which will be located on each of the player 14 and moderator 15 computers or mobile devices. The web browser is what each player 14 and the moderator 15 will use to run the game software 16. The web browser 30 used will depend on what the user (i.e., the player 14 or the moderator 15) has on his/her device, and can include web browsers such as Chrome, Microsoft Edge, Safari, Firefox, Opera, and the like. The game software 16 may be developed so that it is compatible with a variety of web browsers. Further, the game software may be developed to have different versions for the players 14 and the moderator 15 that will be run based on whether the moderator or player instance is chosen during installation and launching of the game. For example, there may be a player instance and a moderator instance of the DAT-engine 32 of the game software 16.

In some embodiments, the game software 16 may also include other communication protocols, such as a client side 18 implementation of the multiplayer-enabling server 23 (see, e.g., top right of FIG. 3) to allow the game software 16 to communicate with the game server 11. For example, Smartfox Server 2X includes a client side JS file to allow communication with the Smartfox Server 2X.

The game engine 24 may include a high-level engine 31 for resource loading and graphics rendering. This high-level engine 31 may utilize the graphics rendering subsystem 26 for implementing resource loading and graphics rendering. The high-level engine 31 may also allow organizing of operations, game state management, object life-cycle management, and sequencing of code and animations at a high level. The high-level engine 31 can provide the "glue" that allows a DAT-engine 32 to communicate with the multi-player-enabling server 23, and may support the user inter-faces 35 and 34 of the moderator 15 and players 14, respectively. For example, the DAT-engine 32 may not directly communicate with the multiplayer-enabling server 23, but the high-level engine 31 may have "glue" classes to communicate with the multiplayer-enabling server 23. Hav-ing a separate high-level engine 31 may allow for easier switching to a different multiplayer-enabling server, if desired. In some embodiments, the open-source game and application framework Pixi Engine, which uses PixiJS, may be used as the high-level engine 31 (source code for Pixi Engine is available at: https://github.com/wuey99/pixi-en-gine). Pixi Engine is an open-source game and application framework built on top of PixiJS. Pixi-Engine includes various "glue" classes such as "ConnectionManager.ts," MessagingManager.ts," and "SFSManager.ts" to communi-cate with the multiplayer-enabling server 23 (e.g., SmartFox Server 2X), allowing the DAT-engine 32 to communicate with the SmartFox Server 2X. However, the present disclo-sure is not limited thereto and any other suitable application framework or high-level engine may be used. In some embodiments, the high-level engine 31 may not be included and the DAT engine 32 may instead perform the features of the high-level engine 31.

The game engine 24 also includes a DAT-engine 32 which converts the XML (e.g., the XML-based UI markup lan-guage) of the game script 28 into the moderator user interface 35 and also allows for simultaneous, synchronized distribution of the audio, visual and/or audiovisual cues to each player 14 as designated in the game script 28. The DAT-engine 32 may drive the game system 10 based on the files designated in the game script 28. The DAT-engine 32 may be built on top of the high-level engine 31 to leverage the state management of the high-level engine 31.

The DAT-engine 32 may access and use the game script 28 to control the game flow and audio and visual features designated on the moderator user interface 35 and showed or played on the player user interfaces 34. For example, the DAT-engine controls and outputs the various visuals that create scene changes for each player 14 on that player's user interface 34. In other words, the game script 28 may be fed into the DAT-engine 32 and used to drive the moderator user interface 35 and the player user interfaces 34. The DAT-engine 32 may also handle room creation, logging in and joining rooms.

The DAT-engine 32 is designed so that modifications to the game, or new games can be implemented without the need to re-program the DAT-engine 32. In some embodi-ments, the game script 28 is embedded/compiled into the DAT-engine 32 directly, while in other embodiments, the game script 28 may be loaded at a particular URL and the moderator 15 can upload the URL of the game script 28 into the DAT-engine 32. In such embodiments, the game script 28 can be changed and the changes will be automatically implemented by the DAT-engine 32 when the game is loaded or re-loaded.

While in the current embodiment the moderator 15 con-trols when each game feature 42 is displayed for the players 14, control could also be automated to occur directly by the DAT-engine 32. In other words, the DAT-engine 32 could direct the game system to automatically move from one game feature 42 to the next game feature 42 based on actions of the players 14, as opposed to the moderator 15 manually moving to the next game feature 42.

The game software 16, including the DAT-engine 32, allows the moderator 15 to control the specific audio and image streams sent individual players 14. Depending on the game script 28, the audio/image information sent to each player 14 may or may not be different. This allows the creation of different perspectives of the game progression for each player 14. When players 14 are connected via the video conference server 13, they can choose to share infor-mation that other players 14 may not have in order to try solve the puzzle of the game.

The moderator user interface 35 is created by the DAT-engine 32 and incorporates the data regarding the game features 42 from the game script 28, thus using the game script 28 to drive the multimedia experience. The moderator user interface 35 directs scene changes, audio commands, etc. to be sent to players 14 via the multiplayer-enabling server 23. The order of events in the game may be defined by the order of the game features 42 in the game script 28.

Figure 5:
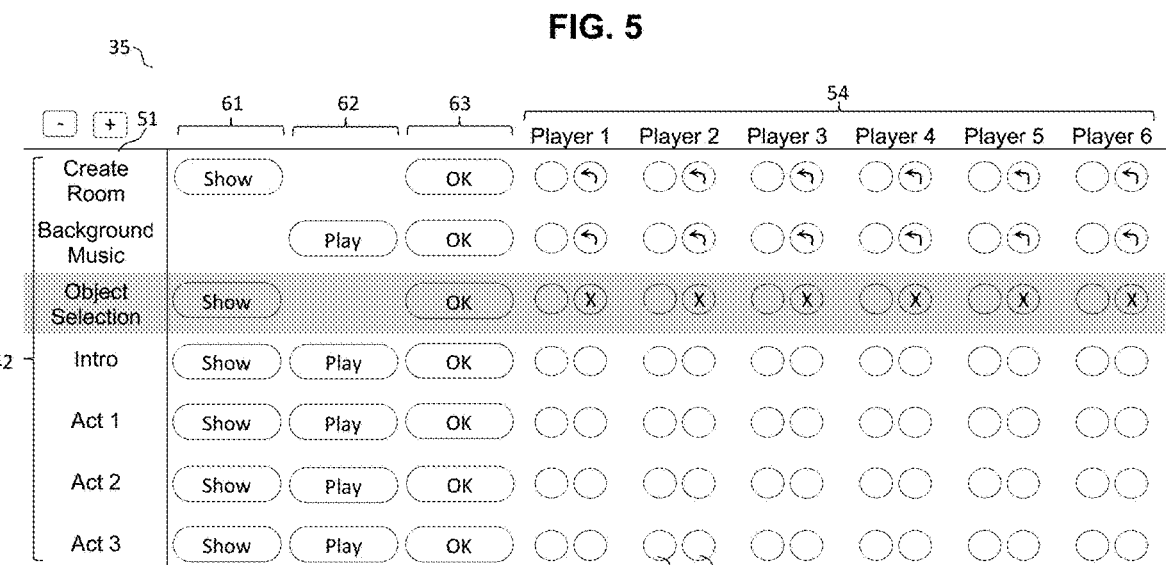
FIGS. 5-6 are examples of a graphic user interface for a moderator of the game system, according to embodiments of the present disclosure.
Figure 6:
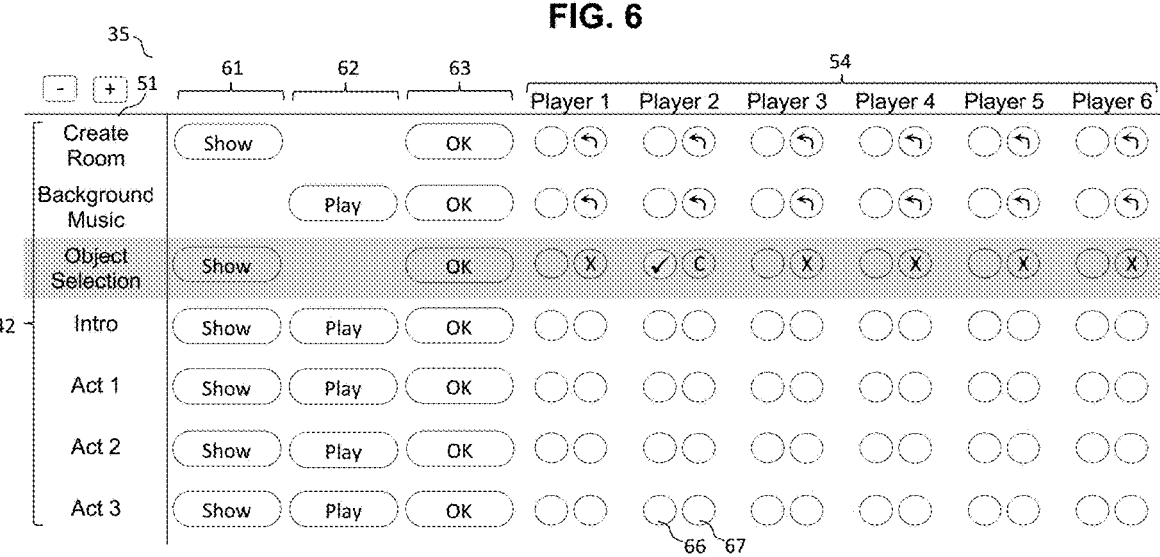

The moderator user interface 35 may include one or more graphical user interfaces and/or other displays. For example, when starting a game on the game system 10, the moderator user interface 35 can have a graphical user interface or display that allows the moderator 15 to create a 'game room'. The game room is used to host the players 14 for each instance of a particular game. The moderator 15 may assign a room ID (e.g., a GUID) for a specific game (e.g., a game previously selected by the players 14) that the moderator 15 can provide to the players 14 so that the players 14 can login to the specific game. The moderator 15 can also assign character roles 54 to each of the players 14 (see, e.g., FIGS. 5 and 6 showing a graphical user interface in which the character roles 54 have been assigned). The character roles 54 will determine what audio and visual files each player 14 will receive. In other words, the players 14 will receive the audio and visual cues specific to the character role 54 they are playing the in the game. While the character roles 54 are assigned generic names Player 1, Player 2, Player 3, etc. in FIGS. 5 and 6, the character roles 54 are not limited thereto, and any suitable character role names may be used. For example, in the Savage Hall game, the character roles are named after the characters the players 14 are playing in Savage Hall, namely, Aggie, Calloway, Goodwin, Grace, Isaak and Marcel.

The moderator user interface 35 be a graphical interface, a display, message window, pop-up or any other suitable graphical interface for sending messages (e.g., commands), so that the moderator 15 and communicate with the players 14, as described in more detail below with reference to FIGS. 5 and 6. The moderator 15 can send messages to individual players 14, or may broadcast messages simulta-neously to all the players in the room. The player user interface 34 may include a different or distinct graphical interface, a display, message window, pop-up or any other suitable graphical interface for receiving and/or sending messages, so that the players 14 can communicate with the moderator 15. The messages and/or commands between the moderator 15 and the players 14 (e.g., the moderator user interface 35 and the player user interface 34) may be relayed by the multiplayer-enabling server 23.

FIGS. 5 and 6 are examples of a graphical interface the moderator 15 of the game system 10 may use to commu-nicate and/or send commands/messages to the players 14, according to one or more embodiments of the present disclosure. In other words, the graphical user interface of the moderator 15 may be an interactive visual representation of the game script 28 that allows the moderator 15 to initiate the sending of the media files defined by the game script 28 to the players 14. FIGS. 5 and 6 show the same graphical user interface at different points in the game play. As shown in FIGS. and 6, this graphical interface may be a display that is part of (e.g., may be included as part of) the moderator user interface 35. While the graphical interface of FIGS. 5 to 6 will be hereinafter referred to as the moderator user interface 35, the interfaces shown in FIGS. 5 to 6 may only be part of the moderator user interface 35 and other graphical interfaces may be available to the moderator 15. The other graphical interfaces may be available to the moderator 15 on the same screen or the moderator 15 may be able to switch to one or more different screens that includes other graphical interfaces.

The moderator user interface 35 may include rows that contain one or more game features 42. The game features 42 may be linked to one or more media files that pertain to the game as provided by the game script 28.

The first column of the moderator user interface 35 may be a description column 51 that includes the same information as provided in the description column 51 of the game script 28 (see, e.g., FIG. 4). The first and second button columns 61 and 62 may include interactive buttons that can be pressed by the moderator 15 to allow specific media files to be shown to or played for the players 14. For example, when the moderator hits the "Show" button in the first button column 61 for a corresponding game feature 42, one or more pre-loaded (or pre-selected) visual files may be displayed to the players 14. The visual files may be the same, similar and/or unique for each player 14. For example, one or more of the visual files may be the same for one or more of the players 14, respectively, and one or more of the visual files may be different for one or more of the players 14, respectively. In some embodiments, all the visual files for the players 14 may be different (e.g., each player 14 may receive a different visual file for a single game feature 42, such as "Act 1") or all may be the same (e.g., each player 14 may receive the same visual file for a single game feature 42). Visual files, including files containing images and/or video, may be pushed to the players 14 through the high-level engine 31 in the game engine 24.

For example, when the moderator 15 presses "Show" in the first button column 61 for the game feature 42 labelled "Act 1," the linked visual files may be displayed to the players 14 on the player user interface 34. The linked visual files may include a scene overlay related to Act I of the game play. These visual files may correspond to the visual files designated for each player 14 in the corresponding row of the game script 28, e.g., the sixth row of game features 42 in FIG. 4 for the Scene Overlay of Act 1. As shown in FIG. 4, each of the players 14 will receive a different visual file in Act 1 that corresponds to the player's character role 54.

After the visual file is shown to the players 14, an indicator 67, such as an "X," may appear in the row for the selected game feature 42 under each character role 54 column to show that the visual file was received by the player 14 having the character role 54 of that column and shown to the player 14 having that character role 54, as shown, for example, in the third game feature 42 row in FIG. 5. In some embodiments, each player 14 may have more than one indicator, for example, first and second indicators 66 and 67, to indicate different conditions, as described in more detail below. After all the players 14 have received and been shown the visual file as indicated by the second indicator 67, the moderator 15 may press the "Play" button in that row if there is one, or if not, the moderator 15 can press the "OK" button in the third button column 63 to move to the next game feature 42. While in the illustrated embodiment the moderator 15 presses "OK" to move to the next game feature 42, the present disclosure is not limited thereto, and the game may automatically continue to the next game feature 42 after all the players 14 have received and been shown the visual file (or after all the players 14 have received and played the audio file).

When the moderator presses the "Play" button in second button column 62 for a corresponding game feature 42, one or more pre-loaded (or pre-selected) audio files may be played for the players 14. The audio files may be the same, similar and/or unique for each player 14. For example, one or more of the audio files may be the same for one or more of the players 14, respectively, and one or more of the audio files may be different for one or more of the players 14, respectively. In some embodiments, all the audio files for the players 14 may be different (e.g., each player 14 may receive a different audio file for a single game feature 42, such as for "Act 1") or all may be the same (e.g., each player 14 may receive the same audio file for a single game feature 42). Audio files, including files containing music, sound or other audio, may be pushed to the players 14 through the high-level engine 31 in the game engine 24.

For example, when the moderator presses "Play" in the second button column 62 for the game feature 42 of "Act 1," each player 14 may be played a unique and distinct audio file audible through the player user interface 34. Each linked audio file may include audio relevant to each player's character role 54 in the game. These audio files may correspond to the audio files designated for each player 14 in the corresponding row of the game script 28, e.g., the seventh row of game features 42 in FIG. 4 for the Audio of Act 1. As shown in FIG. 4, each of the players 14 will receive a different audio file in Act 1 that corresponds to the player's character role 54.

After the "Play" button has been pressed, the word "Play" on the button may change to "Stop." If the "Stop" button is pressed during the playback of the audio file, the moderator 15 can stop the audio file from continuing to play, at which point the button will return to reading "Play." If the "Play" button is then pressed (which would be the third time this specific button would have been pressed), the moderator 15 can reinitiate the playing of the audio file.

While the audio file is being played for the players 14, the first indicator 66 may light up in the row for the selected game feature 42 under each character role 54 column to show that the audio file is playing. For example, a yellow light may flash as the first indicator 66 to show that the audio file is playing. If the players 14 are receiving different audio files, the first indicator 66 may be lit up for different lengths of time for each player 14.

After the audio file is finished playing, the first indicator 66 may stop flashing and may turn off or may turn a solid color, such as green, to show that the audio file was received by the player 14 having that character role 54 and was played by the player 14 having that character role 54. In addition, the second indicator 67, which may be represented by an arrow or the like, may appear in the row for the selected game feature 42 in each character role 54 column that was played the audio file. The moderator 15 may press the arrow to then replay the audio file if desired. For example, one of the players 14 may request that the audio file be replayed, and the moderator 14 can then press the second indicator 67 to replay the associated audio file. After all the players 14 have received and played the audio file as indicated by the indicators 66 and 67, the moderator 15 may press the "OK" button in the third button column 63 to move to the next game feature 42. While in the illustrated embodiment the moderator 15 presses "OK" to move to the next game feature 42, the present disclosure is not limited thereto, and the game may automatically continue to the next game feature 42 after all the players 14 have received and played the audio file.

Some game features 42 may require feedback from the players. For example, in the "Object Selection" row of the game features 42, a display including various objects is shown to the players 14. The players 14 must select an object, for example, one of objects A through F. When one of the players 14 has made a selection, the first indicator 66 may indicate that the selection has been made, for example, by a checkmark or the like, and the second indicator 67 may display what the selection was. For example, in FIG. 6, Player 2 has completed his/her selection of object "C" in the "Object Selection" game feature 42. After all the players 14 have made their selections as indicated by the indicators 66 and 67, the moderator 15 may press the "OK" button in the third button column 63 to move to the next game feature 42. While in the illustrated embodiment the moderator 15 presses "OK" to move to the next game feature 42, the present disclosure is not limited thereto, and the game may automatically continue to the next game feature 42 after all the players 14 have made their selections.

In some embodiments, the game feature 42 that is currently active may be highlighted (e.g., highlighted in a different color than the other game feature 42 rows) to facilitate the moderator 15 in controlling game flow. As shown in FIGS. 5 and 6, the game is currently on the "Object Selection" game feature 42. In FIG. 5, the players 14 have been shown the object selection visual file, but have not made a selection. In FIG. 6, one of the players, Player 2, has made a selection.

In the present embodiment, each player 14 has a column with indicators 66, 67 that correspond to the game features 42. However, the present disclosure is not limited thereto and the indicators 66, 67 can be in any suitable format to indicate to the moderator that the specified conditions (e.g., the playing of the visual or audio file, or the selection of an object) have been completed. In other embodiments in which the game system 10 moves automatically from one game feature 42 to the next, indicators may not be used at all, as the system will continue automatically when the conditions are met without the need for a visual indicator.

In addition, the moderator user interface 35 need not be displayed as a table, but could be displayed via any other suitable form, for example as text or another graphical form.

In some embodiments, the moderator may be able to move from one game feature to the next (e.g., from one row to the next) independent of whether the conditions are met. This feature can be valuable if a player 14 requests going back to a prior game feature 42 because they missed reading or viewing an important text or image at a previous game feature 42, for example. Buttons, such as the "−" and "+" buttons shown in FIG. 5, may be used by the moderator 15 to move up and down the game features 42, respectively.

FIG. 7 shows examples of moderator messages 75 and player messages 74 that may be used by the game software 16, e.g., the DAT-engine 32, in embodiments of the present disclosure.

When the moderator clicks one of the buttons on the moderator user interface 35, a moderator message 75 may be initiated and driven by the DAT-engine 32. The moderator messages 75 are sent to (through) the high-level engine 31, which then sends the moderator messages 75 to (through) the multiplayer-enabling server 23, which then sends the moderator messages 75 to the players 14 with the name of the visual or audio file associated with selected game feature 42 and the character role 54 for each particular player 14 so that each player 14 only receives the audio or visual file associated with his/her character role 54. The audio or visual file name gets translated by the client app of the DAT-engine 32 running on each player's browser (i.e., the player instance of the DAT-engine 32) and/or computer to the location (e.g., URL) of the specified audio or visual file for that player 14. The player 14 can then view and/or play the received audio and/or visual file. In addition, in some embodiments, the moderator messages 75 sent via the moderator user interface 35 may be relayed and/or routed by the multiplayer-enabling server 23 to retrieve the media files, such as graphics, video and audio files, from the web server 22. In addition, the audio subsystem 25 (e.g., resource loaders of the audio subsystem 25) may be used to stream audio files from the web server 22 and the graphics rendering subsystem 26 (e.g., resource loaders of the graphics rendering subsystem 26) may be used to retrieve visual files from the web server 22.

FIG. 7 shows various moderator messages 75 that may be sent. For example, when the moderator presses "Show" on the moderator user interface 35 in a row for an overlay game feature 42, the information pertaining to that button is extracted and the message "SHOW_OVERLAY_MESSAGE" may be sent. When the moderator 15 presses the "Play" button of the moderator user interface 35 in a row for a sound or music, the information pertaining to that button is extracted and may be sent as a "PLAY_SOUND_MESSAGE" or "PLAY_MUSIC_MESSAGE," respectively. When the moderator 15 presses the "Stop" button of the moderator user interface 35 in a row for a sound or music, the information pertaining to that button is extracted and the "STOP_SOUND_MESSAGE" or "STOP_MUSIC_MESSAGE" may be sent, respectively. In other words, the message sent is based on the type of media file (see, e.g., the type column 50 in FIG. 4) and the "Play," "Stop," or "Show" button pressed by the moderator on the moderator user interface 35.

The player user interface 34 may be responsive to moderator messages 75 sent from the moderator user interface 35 and the player user interface 34 may not be capable of sending player messages 74 without the message 74 being a response to a moderator message 75 (e.g., the player user interface 34 may be "dumb"). For example, when an overlay has been displayed on the player user interface 34, the DAT-engine 32 run on the player's browser 30 (i.e., the player instance of the DAT-engine 32) may send an "OVERLAY_RESPONSE_MESSAGE" back to the moderator 15 and the second indicator 72 on the moderator user interface 35 may change to indicate that the visual file was displayed (e.g., an "X" may be displayed at the second indicator 72. In some embodiments, a game feature 42 may include text for the players 14 to read, and the visual file may include a button that the player user interface 34 will display and that the player 14 can press when they are finished reading the text to indicate that they are ready to move on. When the player pressed that button, the "READYUP_MESSAGE" may be sent to the moderator 15 to indicate that the player is ready to move on to the next game feature 42.

When an audio file finishes playing for a player 14, a "COMPLETE_MESSAGE" may be sent from the DAT-engine 32 on the player's browser 30 (i.e., the player instance of the DAT-engine 32) to the DAT-engine 32 on the moderator's browser 30 (i.e., the moderator instance of the DAT-engine 32) via the multiplayer-enabling server 23 to tell the moderator 15 that the audio file is finished, as may be shown on the moderator user interface 35 by the first indicator 71 as described in more detail above.

In some embodiments, additional player and/or moderator messages 74/75 may be included. For example, a READYUP_MESSAGE may be sent after the players 14 have all logged into the game and the moderator 15 has assigned the character roles 54. The players 14 may click a button on their player user interface 34 to indicate that they are ready to move forward into the game play. For example, if the log in page for the players contains text and/or other information for the players 14 to read/view to introduce the game, the players 14 may click the button initiating the READYUP_MESSAGE after reading/viewing the introductory information, as discussed regarding the homepage with respect to FIGS. 2 and 3 and in more detail below. This button click may initiate the READYUP_MESSAGE. In response to this player message 74, the moderator message 75 SCENECHANGE_MESSAGE may be sent to initiate a visual (e.g., background art) change to the player user interface 34.

In the current embodiment, the game system 10 takes advantage of the private message capability of the Smartfox Server 2X, which is used as the multiplayer-enabling server 23 in the current embodiment. Moderator messages 35 are relayed using MessagingManager and MessagingSubManager (two classes) in the open-source Pixi-engine, which is used as the high-level engine 31 in the current embodiment, that provides a custom interface to the Smartfox Server 2x's private messaging API calls. MessagingManager and MessagingSubManager implements additional functionality that ensures that messages are actually received by the players 14. The players 14 receive a message containing the audio or visual file name associated with selected game feature 42 and the character role 54 for each particular player 14. The client app of the DAT-engine 32 that the player 14 is running uses the audio subsystem 25 to stream the audio file from the Web Server 22 in the case of an audio file and uses the graphics rendering subsystem 26 to display the visual file from the Web Server 22 in the case of a visual file. Once the audio file finishes playing (or the visual file is displayed), the player 14 sends a "complete" message back to the moderator which the AudioPlayer component receives. The AudioPlayer then updates the UI to signal to the moderator that the participant has received and successfully played back the audio completely.

FIG. 8 is a method for executing a game according to embodiments of the present disclosure.

Prior to the start of the game, a user will complete the game script 28, including the providing (e.g., defining) the game features 42 and the media files to be used during the game features 42 (S800). The game script 28 is then accessed and used by the DAT-engine 32 (S801). In some embodiments, the game script 28 will be converted into a format usable for use by the DAT-engine 32 (e.g., XML). As described able, the game script may be defined as a spreadsheet or other format and converted to a format readable by the DAT-engine, such as an XML version. In some embodiments, the game script can be baked in (e.g., hardcoded or compiled) into the DAT-engine 32 or it may be loaded into the DAT-engine by the moderator 15, from, for example, a URL, e.g., an external URL, when the game begins.

The moderator 15 loads a moderator instance of the DAT-engine 32 into his/her web browser 30 and creates a room (e.g., a 'game room') for the game to take place in (S802). In some embodiments, the moderator 15 may load the moderator instance of the DAT-engine 32 and then the game script 28 may be accessed and used by the DAT-engine

32. The moderator instance and a player instance of the DAT-engine may both be contained within the code of the DAT-engine 32. Whether the DAT-engine runs in moderator or player mode (e.g., whether it runs the moderator or player instance of the DAT-engine 32) depends on the mode selected when the DAT-engine is launched.

The moderator 15 may assign a room ID for the game (e.g., a unique GUID) and the room ID may be distributed to all players 14 in the game (S803). In some embodiments, the room ID may be automatically assigned by the DAT-engine 32 and distributed to the players 14. In some embodiments, after the moderator 15 loads the game into his/her web browser, the game script 28 may be loaded by the DAT-engine 32 to run the game. For example, the game script 28 may be located at a URL and may be supplied by the DAT-engine 32.

Each player 14 will start the player instance of the DAT-engine 32 and login with the room ID supplied by the moderator (e.g., supplied via the multiplayer-enabling server 23) or supplied automatically via the DAT-engine 32 (S804). The players 14 will enter a holding room (e.g., a homepage), until all players 14 have logged in. A homepage visual file and background music may play while the players 14 who have logged in wait for the other players 14 (see, e.g., the first and second game feature 42 rows in FIGS. 4-6). The homepage may have text and/or other information for the players 14 to read/view to introduce the game.

Once all the players 14 have entered the room, the moderator 14 will be notified of such and will assign each player a character role 54 (S805). The character role 54 is passed to the multiplayer-enabling server 23 to identify the media files for each player 14 based on the character role 54 assigned to him/her. The character roles 54 may be embedded as attributes and may be held only by the moderator 15 (e.g., by the DAT-engine 32 on the moderator's computer). In some embodiments, the moderator 15 may maintain an internal list matching the character roles 54 to a user ID for each player 14 in the room. The moderator software (e.g., the instance of the DAT-engine 32 on the moderator's browser) may use the character role 54 and/or user ID for the players 14 to determine which media files are played/shown by the player 14 connected in the room.

Each player 14 may be informed of the character role 54 that he/she is assigned. The players 14 and the moderator 15 may also open a browser or application to run the video conference server 13 and enable the players and the moderator 15 to communicate with each other through a virtual meeting room. The moderator 15 may mediate communications between the players via the video conference server 13. While in the present embodiment the video conferencing software is separate from the game software, in some embodiments, the game software 16 can be embedded into the video conferencing software, for example, as a web view (e.g., as a Zoom® App) or the video conferencing software can be embedded as a library (e.g., via a java script library such as Zoom® Apps SDK).

At this point, the moderator 15 may be shown a graphical user interface of the moderator user interface 35, examples of which are shown in FIGS. 5-6, that allows him to communicate with the players 14 (S806). After the moderator user interface 35 is displayed, the moderator 15 can start chronologically moving through the game features 42 to conduct the game.

For each game feature, the moderator 15 can show or play media files associated with that game feature 42 (as defined in the game script 28) by pressing the "Show" or "Play" buttons, respectively, on the moderator user interface 35

(S807). When the moderator 15 presses the "Show" or "Play" button, a MediaPlayer component is triggered (S808). The MediaPlayer is a UI component of the DAT-engine 32 that is created from the game script 28 and contains information about the character role 54 with which it is associated and information about the media file associated with that character role 54, such as the name and location (e.g., URL) of the media file. The MediaPlayer is visualized in the first and second indicators 66 and 67 as shown and discussed with respect to FIGS. 5 and 6. In some embodiments, the MediaPlayer may also include/show the status of the media file from the player 14 (e.g., whether the audio file has finished streaming and/or whether the visual file has been displayed) and contains a retry button to allow the moderator to resend an audio request to the player 14, if needed or desired, as discussed in more detail above regarding FIGS. 5 and 6. There is a MediaPlayer for each character role 54/player 14 and the MediaPlayer component for each character role 54 specifies the audio and/or visual file to be sent to each player 14 for playback. As discussed in more detail above, the audio and/or visual files may be the same or different.

The DAT-engine 32 runs a loop to determine which file is sent to which player 14 based on the character role 54 assigned to that player 14. For example, when the moderator 15 presses "Show" or "Play," the MediaPlayer is triggered multiple times, once for each character role 54 (S808) for the selected game feature 42. The moderator instance of the DAT-engine 32 may include a loop to allow the audio and/or visual file for a character role 54 to be simultaneously or near simultaneously sent to the correct player 14. For example, the moderator instance of the DAT-engine 32 obtains the character role 54 and converts it to the identifying information for each player 14 logged into the room, so that the correct media file is sent to the correct player 14. In other words, when the moderator 15 presses the "Play" or "Show" button, the information regarding the audio and/or visual file contained in the MediaPlayer component is sent simultaneously or near simultaneously to the player 14 having the character role 54 specified in the MediaPlayer. This information is sent via a message, e.g., the moderator messages 75 beginning with SHOW and PLAY, respectively, as shown in FIG. 7.

The message is relayed from the moderator instance of DAT-engine 32 using the high-level engine 31, which includes functionality (e.g., classes) to ensure that the messages are received by the players 14. The message (e.g., the moderator messages 75 beginning with SHOW and PLAY, respectively, as shown in FIG. 7) to display the visual file or play the audio file, respectively, is sent to the players 14 connected to each character role 54 along with the name (which includes the location) of the visual or audio file, respectively, associated with that character role 54 (S809). When each player 14 receives that message, the player's instance of the DAT-engine 32 looks up the location (e.g., the URL) for the visual or audio file and uses the graphics rendering subsystem 26 or the audio subsystem 25, respectively, to display or stream the content of the visual or audio file, respectively. When the content is displayed or has finished streaming, a message (see, e.g., "COMPLETE-_MESSAGE" shown in FIG. 7) is sent back to the moderator 15 via the multiplayer-enabling server 23 to indicate success (S810). The MediaPlayer then updates the moderator user interface 35 to signal to the moderator 15 that the player 14 has received and successfully viewed/played back the visual/audio file, respectively. Thus, in the current embodiment, the visual or audio file isn't streamed to the players 14, only the name of the visual or audio file is transmitted and once the player 14 receives the visual or audio file, the player's instance of the DAT-engine 32 asks/requests the web server 22 via the graphics rendering subsystem 26 or the audio subsystem 25 to display or stream the visual or audio file, respectively. This process enables different audio and image files to be sent to different players simultaneously or near simultaneously.

Because players listen to their own distinct tracks, based on their assigned character role, in synchronicity with the other players, performative actions can be encouraged and directed to specific players at specific times. These actions are presented to the other players in such a way that players can become a performer in each other's show. This takes place in physical actions as well as lines of dialogue. In some embodiments, players can be separated into groups to form alliances to try and solve the game before other players.

The game system and method enable revelations to take place organically between players at pre-determined intervals. In addition, the above system and method allow for the onboarding process to be embedded within the objective of the game. As such, part of the game can be to figure out how to properly interact with the game. The above system and method can offer a collaborative and immersive experience.

Because the game engine yields visual storytelling performed by the players engaged in the game, the presentation of the game can also be a form of the entertainment value to spectating individuals not engaged in interacting with the game. In this way the players of the game are actors in a show for the benefit of the other players as well as potential audience members watching the show unfold. Because every group of player interacts with the game differently, these variations allow for different outcomes to arise every instance. This too, increases the entertainment value for spectators. Furthermore, players who have previously engaged in the game may be enthused to participate as an audience member in order to experience how other groups interact with each other during their instance.

By design, this game can be used to prioritize role-playing over the game-winning objective, which offers very interesting moral drama to swirl. This is achieved by affording each player their own personal inner monologue that promotes narrative subjectivity As driven by the DAT-engine, the moderator user interface and game script are user friendly and have an accessible organizational structure. This allows for build-your-own game options, where amateur game developers can build out a game script and use the moderator user interface to design and play games with their friends. In some embodiments, the game script may allow files to be "drag-and-drop," so that visual and audio files and easily be imported for the various character roles and game features. The audio and visual files may be stored locally in a folder designated by the user or a server, such as a cloud server, may be available for storage.

While embodiments are described in which the script is a game script, the present disclosure is not so limited, and the system may also be used as an interface for scripting presentations or teaching lessons, for example, with audio and visual files may be selected for those purposes. This system and method can be applied to educational purposes where all students are informed by different information and are enabled to discuss their provided vantage points in such a way that conclusions can be rendered in an organic way. The game system and method can be applied in such a way that creates efficiency in delivering relevant content and briefing information to multiple departments within an organization with different duties, motives, understanding of the various subjects or even native languages. In this way, discreet audio/video channels are being sent to appropriate members of the organization in synchronicity, with predetermined stopping points to discuss the content at large. The game model is modular and can be easily updated with new content, narratives and subject matters.

Methods according to embodiments of the present disclosure described herein may be implemented utilizing any suitable hardware, firmware, software, or a combination of software, firmware, and hardware. The various steps of the embodiments may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

While certain embodiments of the present disclosure have been illustrated and described, it is understood by those of ordinary skill in the art that certain modifications and changes can be made to the described embodiments without departing from the spirit and scope of the present disclosure as defined by the following claims, and equivalents thereof.

What is claimed is:

1. A method for synchronized playback of different audio inputs to different players performed by a computing apparatus comprising at least one processor, the method comprising:

accessing a script by an engine, wherein the script comprises locations of media files associated with character roles and each respective character role of the character roles is associated with a different media file of the media files;

creating a mediaplayer component in the engine based on information from the script;

loading an instance of the engine by a moderator;

loading other instances of the engine by players, associating each respective character role with a respective one of the players; and transmitting a message to the players wherein each of the players substantially simultaneously receives a different media file of the media files, comprising:

triggering the mediaplayer component, wherein the mediaplayer component comprises information regarding which of the character roles is associated with which of the players, and comprises the locations of the media files associated with each of the character roles;

determining which of the media files is to be sent to which of the players based on the character roles associated with each of the players;

sending each respective location of the locations of the media files to the respective one of the players that is associated with the respective character role to which the different media file is associated; and receiving and playing or viewing the media files by the players.

2. The method of claim 1, further comprising: assigning a room identification number by the moderator; and logging into a game room using the room identification number by the players.

3. The method of claim 1, further comprising running video conference software by the players and the moderator.

4. The method of claim 1, wherein the script comprises a game script and the engine comprises a game engine.

5. The method of claim 4, further comprising defining game features in the game script.

6. The method of claim 5, further comprising controlling a game sequence by the moderator progressing though the game features on a moderator user interface.

7. The method of claim 6, wherein interface components of the moderator user interface are defined by the game script.

8. The method of claim 7, wherein the mediaplayer component is a user interface component on the moderator user interface and triggering the mediaplayer component is initiated by the moderator via the moderator user interface.

9. The method of claim 1, wherein the media files comprise audio files.

10. The method of claim 1, wherein the media files comprise visual files.

11. A computer readable medium comprising stored instructions, which when executed by a processor, cause the processor to initiate synchronized playback of different audio inputs to different players according to the method of claim 1.

12. A system for synchronized playback of different media inputs performed by a computing apparatus comprising at least one processor, the system comprising:

means for accessing a script by an engine, wherein the script comprises locations of media files associated with character roles and each respective character role of the character roles is associated with a different media file of the media files;

means for creating a mediaplayer component in the engine based on information from the script;

means for loading an instance of the engine by a moderator;

means for loading other instances of the engine by players, means for associating each respective character role with a respective one of the players; and means for transmitting a message to the players wherein each of the players substantially simultaneously receives a different media file of the media files, comprising:

means for triggering the mediaplayer component, wherein the mediaplayer component comprises information regarding which of the character roles is associated with which of the players, and comprises the locations of the media files associated with each of the character roles;

means for determining which of the media files is to be sent to which of the players based on the character roles associated with each of the players;

means for sending each respective location of the locations of the media files to the respective one of the players that is associated with the respective character role to which the different media file associated; and means for receiving and playing or viewing the media
files by the players.

\* \* \* \* \*